US009344969B2

(12) United States Patent
Marks

(10) Patent No.: US 9,344,969 B2
(45) Date of Patent: May 17, 2016

(54) ENHANCED POWER CONSERVATION FOR MOBILE PHONES

(75) Inventor: Laurence V. Marks, Raleigh, NC (US)

(73) Assignee: International Business Machines Corporation, Armonk, NY (US)

(*) Notice: Subject to any disclaimer, the term of this patent is extended or adjusted under 35 U.S.C. 154(b) by 70 days.

(21) Appl. No.: 13/369,369

(22) Filed: Feb. 9, 2012

(65) Prior Publication Data

US 2013/0210403 A1 Aug. 15, 2013

(51) Int. Cl.
*H04W 52/10* (2009.01)
*H04W 52/02* (2009.01)
*H04W 52/32* (2009.01)
*H04W 52/36* (2009.01)

(52) U.S. Cl.
CPC .......... *H04W 52/10* (2013.01); *H04W 52/0254* (2013.01); *H04W 52/325* (2013.01); *H04W 52/367* (2013.01); *Y02B 60/50* (2013.01)

(58) Field of Classification Search
CPC ..... H04W 48/16; H04W 48/18; H04W 48/20; H04W 52/02; H04W 52/0254; H04W 7/08; H04W 7/08334; H04W 64/00; H04W 52/0251; H04W 52/0256; H04W 52/10; H04W 52/325; H04W 52/367; Y02B 60/50
USPC ........... 455/414.1, 421, 422.1, 423, 425, 434, 455/435.1, 436, 456.1, 456.2, 456.3, 456.6, 455/445, 455
See application file for complete search history.

(56) References Cited

U.S. PATENT DOCUMENTS

| | | | |
|---|---|---|---|
| 5,375,254 A * | 12/1994 | Owen | H04M 1/72511 455/161.1 |
| 6,999,800 B2 | 2/2006 | Peng et al. | |
| 7,266,389 B2 | 9/2007 | Karaoguz et al. | |
| 7,421,291 B2 | 9/2008 | Karaoguz et al. | |
| 7,706,772 B2 | 4/2010 | Malcolm | |
| 7,941,180 B2 | 5/2011 | Karaoguz et al. | |

(Continued)

FOREIGN PATENT DOCUMENTS

CN 1801669 A 7/2006

OTHER PUBLICATIONS

"An Analysis of Power Consumption in a Smartphone", Aaron Carroll and Gernot Heiser; 2010 Usenix Annual Technical Conference.

(Continued)

*Primary Examiner* — George Eng
*Assistant Examiner* — Hung Du
(74) *Attorney, Agent, or Firm* — Law Offices of Ira D. Blecker, P.C.

(57) ABSTRACT

A mobile phone initially probes while in an open-loop mode with an estimated power level based on the received power level from a base station. If a response is not received, power is incremented, and a subsequent probe is sent. The process is repeated until a response is received or when maximum power is reached. If a response is still not received, the mobile phone tests for changing its location state. When BTS probes are unsuccessful and maximum power is reached, available sensors are sampled and tested for a change of state, e.g., by way of an inclinometer, an accelerometer, a magnetometer, a GPS, standard 802.11, or employing a Bluetooth, and the like. If no state change is detected, a delay block is entered, reducing the probing rate and the power consumption rate. If a state change is detected, the delay block is bypassed and probing resumes immediately.

10 Claims, 6 Drawing Sheets

(56) References Cited

U.S. PATENT DOCUMENTS

| | | | |
|---|---|---|---|
| 2004/0259528 A1* | 12/2004 | Gandhi et al. | 455/411 |
| 2007/0004376 A1 | 1/2007 | Kogure | |
| 2009/0059899 A1* | 3/2009 | Bendelac | 370/352 |
| 2009/0131081 A1* | 5/2009 | Abdel-Kader et al. | 455/456.6 |
| 2010/0307016 A1* | 12/2010 | Mayor et al. | 33/356 |
| 2011/0003590 A1* | 1/2011 | Yoon | H04W 36/385 455/432.1 |
| 2011/0201335 A1* | 8/2011 | Garrett | H04W 36/32 455/436 |
| 2011/0312308 A1* | 12/2011 | Willey | 455/414.1 |
| 2012/0083290 A1* | 4/2012 | Jung et al. | 455/456.1 |
| 2012/0190379 A1* | 7/2012 | Hassan et al. | 455/456.1 |
| 2013/0130738 A1* | 5/2013 | Cherian et al. | 455/522 |
| 2013/0176869 A1* | 7/2013 | Finlow-Bates et al. | 370/252 |

OTHER PUBLICATIONS

"Boosting Smartphone Battery Life", Electronic Component News, Monday Sep. 19, 2011.

"Modern Sensors Greatly Enhance Consumer-Electronic-System Performance", EDN, Sep. 23, 2011.

* cited by examiner

ENHANCED POWER CONSERVATION FOR MOBILE PHONES

FIELD OF THE INVENTION

The present invention relates to mobile radio and more particularly to cellular telephony, i.e., mobile radiotelephony.

BACKGROUND AND RELATED ART

The power with which a cellular telephone, also referenced to as a mobile phone, transmits messages regulated by commands from the cellular base station, also referred as a base-transceiver station (BTS), which sets it to a specified level. Regulation occurs to prevent cellular phones near a tower from generating a signal so strong as to interfere with BTS reception from other units located further from the tower. Ideally, all phones will transmit at levels which appear equal at the tower. The transmit power levels are also managed to minimize interference with surrounding cells. This management is well-known in the art, and is described, e.g., in the US Standard for CDMA, TIA/EIA-95B, March 1999, pages 6-5 through 6-12.

Modern mobile phones are designed for power-conservation. They are typically constructed from CMOS circuits which consume significant power only when switching. The processor and many ancillary features are designed with an operational state and one or more low-power "sleep" states where switching rates are reduced or terminated for power conservation. Such phones "wake" periodically to receive and respond to polls from the BTS and to inputs from the user.

Referring to FIG. 1, for illustrative purposes a conventional mobile phone is shown.

FIG. 2 shows two conventional mobile phones (201, 202) at differing ranges from BTS 200. The signal 204 transmitted from mobile phone 202 is transmitted with greater power than signal 203 transmitted from mobile phone 201 located in close proximity to BTS 200. Clearly, the battery of mobile phone 202 will discharge more rapidly than that of mobile phone 201.

FIG. 3 depicts a problem addressed by the present invention. Mobile phone 100 is unable to communicate with BTS 200 due to the influence of shielding 300. BTS signals 301 cannot reach mobile phone 100. The signal 302 of mobile phone 100 does not reach BTS 200 although the mobile phone 100 is transmitting at maximum power while rapidly discharging its battery.

FIG. 4 is a flowchart illustrating the operation of conventional mobile phones. When in an open-loop mode, i.e., prior to achieving two-way communication with the BTS, the mobile phone starts probing 401 in the open-loop mode with an estimated power level based on the power level received from the base station. If a response 402 is not received and the mobile phone is not transmitting at maximum power 403, power is incremented 404, and a subsequent probe 405 is transmitted. This process is repeated until a response is received 402, or when maximum power 403 is reached. If maximum power is reached without receiving a response, the mobile phone continues sending probes at maximum power 405. If a response is received, the mobile phone enters a closed-loop mode 406, and transmits at power levels commanded by the BTS 407, as long as contact with BTS is maintained. If the contact with BTS is lost, the mobile phone re-enters the open-loop mode 401.

A variety of sensors may be used, singly or in combination to determine a change in the location of a mobile phone. These include but are not limited to accelerometers, inclinometers, magnetometers, and global positioning systems, all of which sense change in location. Sensors can also detect the presence or absence of local- or personal-area networks, such as IEEE 802.11, defined as a set of standards for implementing wireless local area network (WLAN) computer communication, or Bluetooth (standardized by the Bluetooth Special Interest Group) defined as wireless technology standard for exchanging data over short distances. Generally, a change in reachability to a local network implies a change of location.

The problem addressed by the present invention revolves around a rapid battery drain which occurs when a mobile phone is unable to establish contact with the BTS because it is located too remotely or within a no-reception area such as a shielded building, automotive glove compartment, or steel desk drawer. Users find it extremely frustrating to frequently charge a mobile phone that is not even usable inside an office building, or to take the mobile phone from its storage location in a glove compartment or desk and find it discharged.

Power conservation is an important consideration for mobile phones. The package of every mobile phone carries a rating for battery life in conversation ("talk time") and passive uses.

In a paper entitled "An Analysis of Power Consumption in a Smartphone," Carroll, Aaron and Gernot Heiser, 2010 Usenix Annual Technical Conference it is demonstrated that the greatest consumer of power in a smart mobile phone is the Global System Mobile (GSM), a cellphone standard function. Hence reducing or eliminating this power drain when it is non-productive is the best way to extend the battery charge lifetime.

Presently, the art addresses power management in a device containing electronics modules for a mobile phone, a wireless personal area network, a wireless local area network, and a pager or short message service. The modules may be selectively powered off to extend the battery life. Yet, the present art fails to address reducing the power expended on mobile phone service without regard to other services.

Although the industry is aware of the desirability of robust power conservation, no solution has been developed which deterministically addresses the technique of quiescing (napping) based on the absence of a signal received.

Accordingly, there is a long-felt need for a reliable, deterministic way to determine when to quiesce the mobile phone, and more importantly, when to restore it to normal operation. This problem has not been addressed in the industry, and neither have approaches to power conservation been considered by determining and using information related to the phone's location.

SUMMARY

In one aspect, the invention provides a method for conserving power by minimizing or ceasing useless power-expensive probes when a base-transceiver station BTS is unreachable and instead uses power-miserly sampling of device location.

Power conservation can be achieved by multiple means. Non-productive mobile phone probes are minimized or eliminated. Power is also not consumed in generating such probes and attempting receipt of responses. It is even possible to use a very low-power processor to sample the location sensors while quiescing the processors normally used.

In one embodiment, the present invention provides a method for enabling a mobile phone to achieve the quiescent state. The method makes it possible for mobile phones to sense a physical location through a plurality of locating means, including global positioning systems (GPS), E911 locators, and the like. In another embodiment, the mobile phones can detect changes in orientation through signals provided by internal magnetometers.

In another embodiment, the mobile phones detect changes in position through signals provided preferably by internal accelerometers and inclinometers and infer position changes by changes in availability of short-range radio-frequency signals, including those provided by IEEE 802.11 local area networks (LANs) or Bluetooth personal area networks (PANs).

In yet another embodiment, the mobile phone detects that it is unable to communicate with BTS when using its highest transmission power. It then ceases the power-consuming attempt and begins an economical polling, preferably at a slow rate of one or more location sensors as listed above. The mobile phone enters a power-conserving quiescent state between such polls.

In a further embodiment, once a motion or position change is detected or inferred, the mobile phone resumes normal attempts to achieve communication with the BTS, and in the absence thereof, if communication is again unachievable the quiescent state is resumed.

In still another embodiment, a method is provided for a mobile phone achieving a quiescent state, the method including: having the mobile phone probe while in an open-loop mode, failing to receive a response from a base-transceiver station (BTS) within a predetermined time; upon receiving no response, sampling sensors to reduce probing rate and power consumption rate, and test for a state change; if no state change is detected, invoking a variable delay coupled to the sensors; and bypassing the delay and resuming the probing when the state change is detected.

BRIEF DESCRIPTION OF THE DRAWINGS

The present invention will be understood and appreciated more fully from the following detailed description of the invention, taken in conjunction with the accompanying drawings of which.

DETAILED DESCRIPTION

Detailed embodiments of the present invention are disclosed hereinafter. It is to be understood that they are merely illustrative of the invention that may be embodied in various forms. In addition, each of the examples given in connection with the various aspects of the invention is intended to be illustrative, and not restrictive. Therefore, specific structural and functional details disclosed herein are not to be interpreted as limiting, but merely as a representative basis for teaching one skilled in the art to variously employ the present invention.

Figure 1:
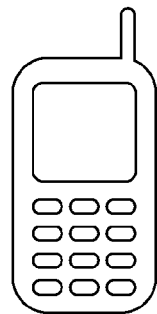
FIG. 1 shows an exemplary prior art mobile phone.
Figure 2:
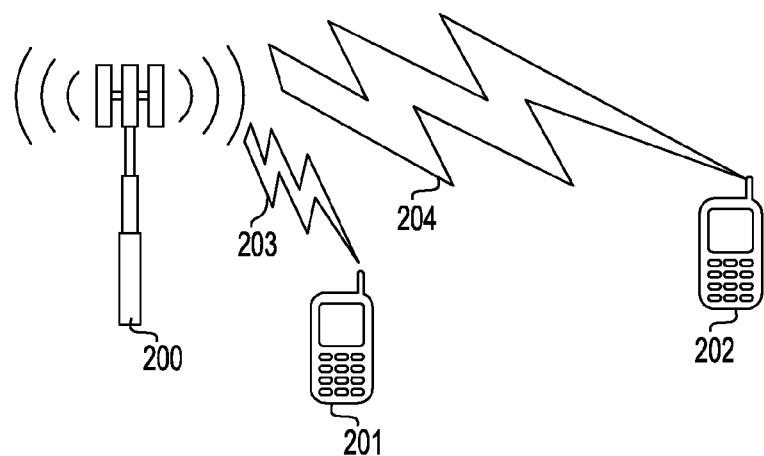
FIG. 2 illustrates an example of two prior art mobile phones at differing distances from a BTS.
Figure 3:
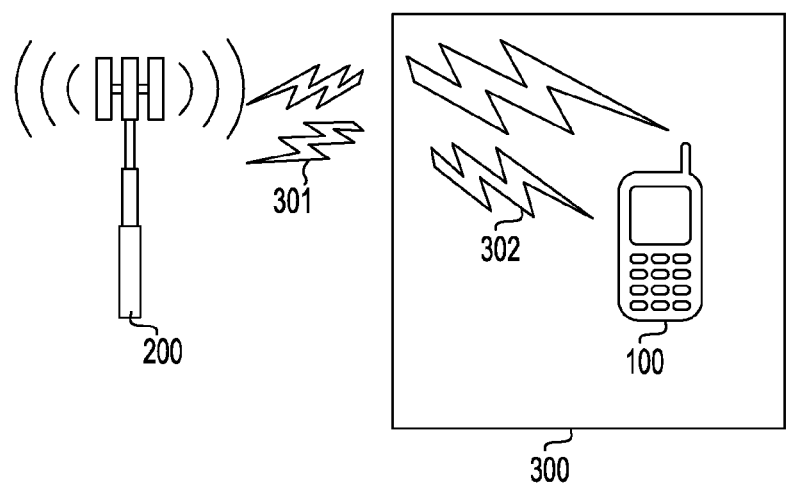
FIG. 3 depicts a mobile phone in a shielded environment, unable to communicate with a BTS as known in the prior art.
Figure 4:
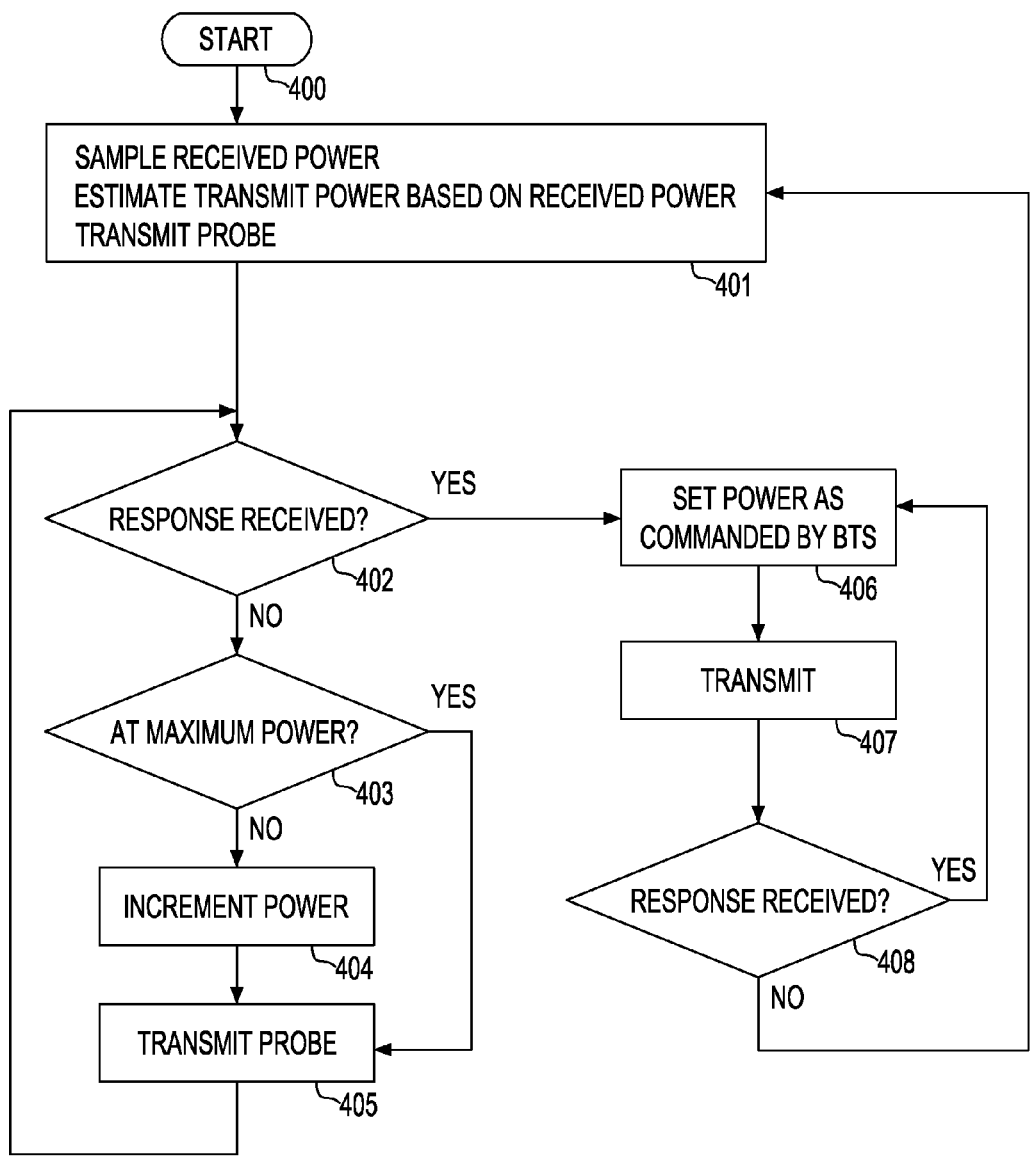
FIG. 4 show an example of a prior art power management as practiced in mobile phones.
Figure 5:
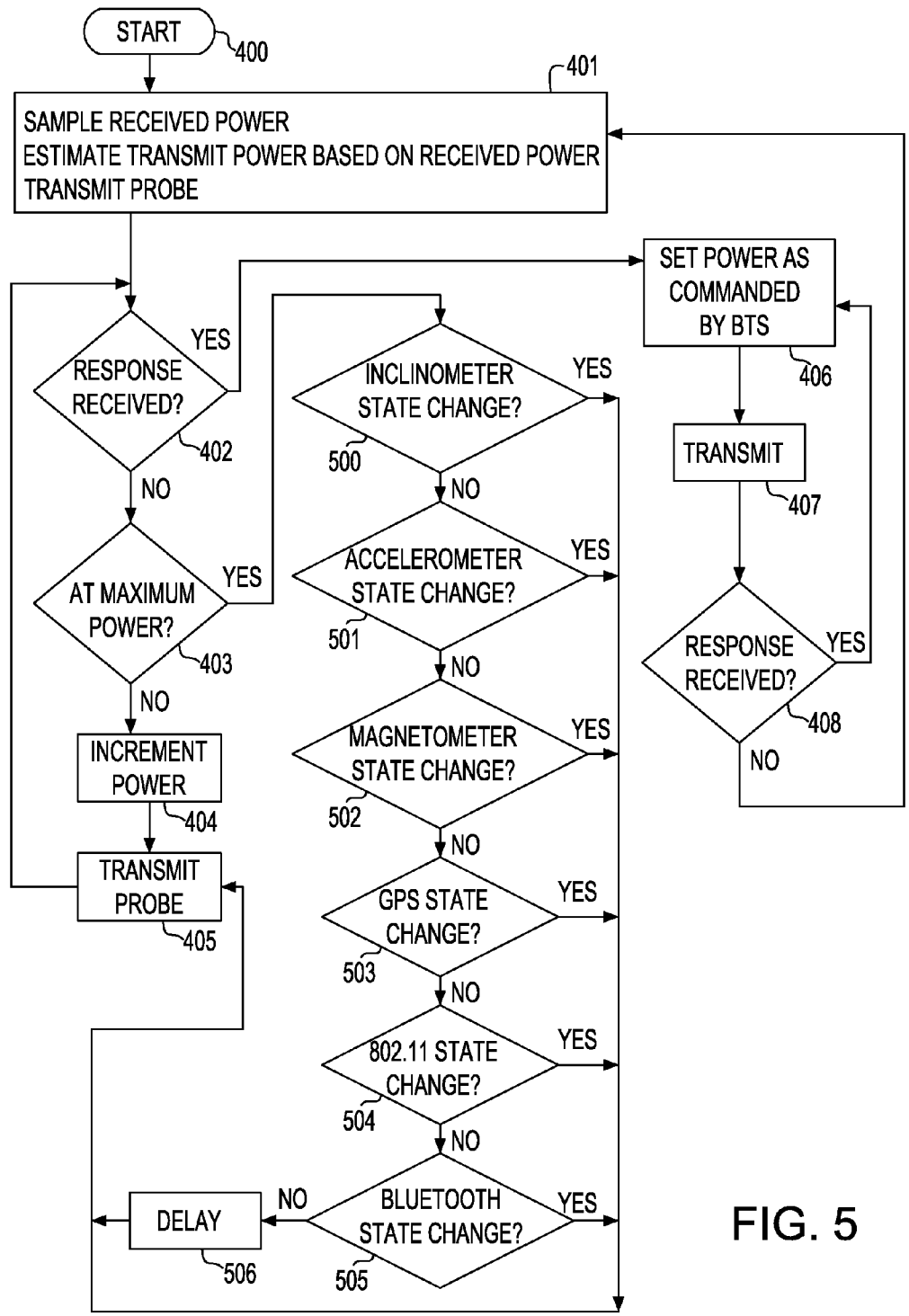
FIG. 5 illustrates power management and conservation of a mobile phone, according to an embodiment of the present invention.

Referring to FIG. 5, a flowchart illustrates an exemplary operation of an embodiment of the present invention. As previously described, the mobile phone initially starts probing 401 (see FIG. 4), in open-loop mode with an estimated power level based on the received power level from the base station. If a response 402 is not received and the mobile phone is not transmitting at maximum power 403, the power is incremented 404, and a subsequent probe is then sent 405. This process is repeated until a response is received 402, or maximum power is reached 403. If the maximum power is reached without receiving a response, the mobile phone begins testing for a change in its location state. It can be assumed that if the mobile phone and BTS cannot achieve communication when the mobile phone is at a particular location, that communication will not become available unless the mobile phone is relocated. When probes of the BTS are unsuccessful and maximum power 403 is reached, available sensors are sampled and tested for a change of state, e.g., by way of one or more of inclinometer 500, accelerometer 501, magnetometer 502, GPS 503, standard 802.11 504, employing a Bluetooth 505, and the like. If no state change is detected, delay block 506 is activated, serving the purpose of reducing the probing rate, and accordingly the power consumption rate. If a state change is detected, delay block 506 is bypassed and probing resumes immediately. The degree of delay may be predetermined. Longer values of delay conserve more power but reduce its responsiveness to state changes.

The sequence in which sensors are sampled is arbitrary. Sampling in orders other than that those illustrated in FIG. 5 and discussed herein are equally useful. The set of sensors shown in FIG. 5 is intended to be exemplary and not restrictive in any way. Sensors can be interchanged by others, such as, for instance, gyroscopic sensors, that can be added. The invention is functional with even one single sensor.

State change detection performed by blocks 500, 501, 502, 503, 504, and 505 is now discussed in greater detail.

Detection of a change in location is similar regardless of the type of sensor input. In each case a new sample is compared to the preceding sample. If there is a difference, a location change is presumed to have taken place. This can be, e.g., a difference between two successive inclinometer samples indicating that the device orientation has changed or the appearance of a IEEE 802.11 network not present on the previous sample is now detected, or conversely when experiencing the disappearance of a previously-detected IEEE 802.11 signal.

Figure 6:
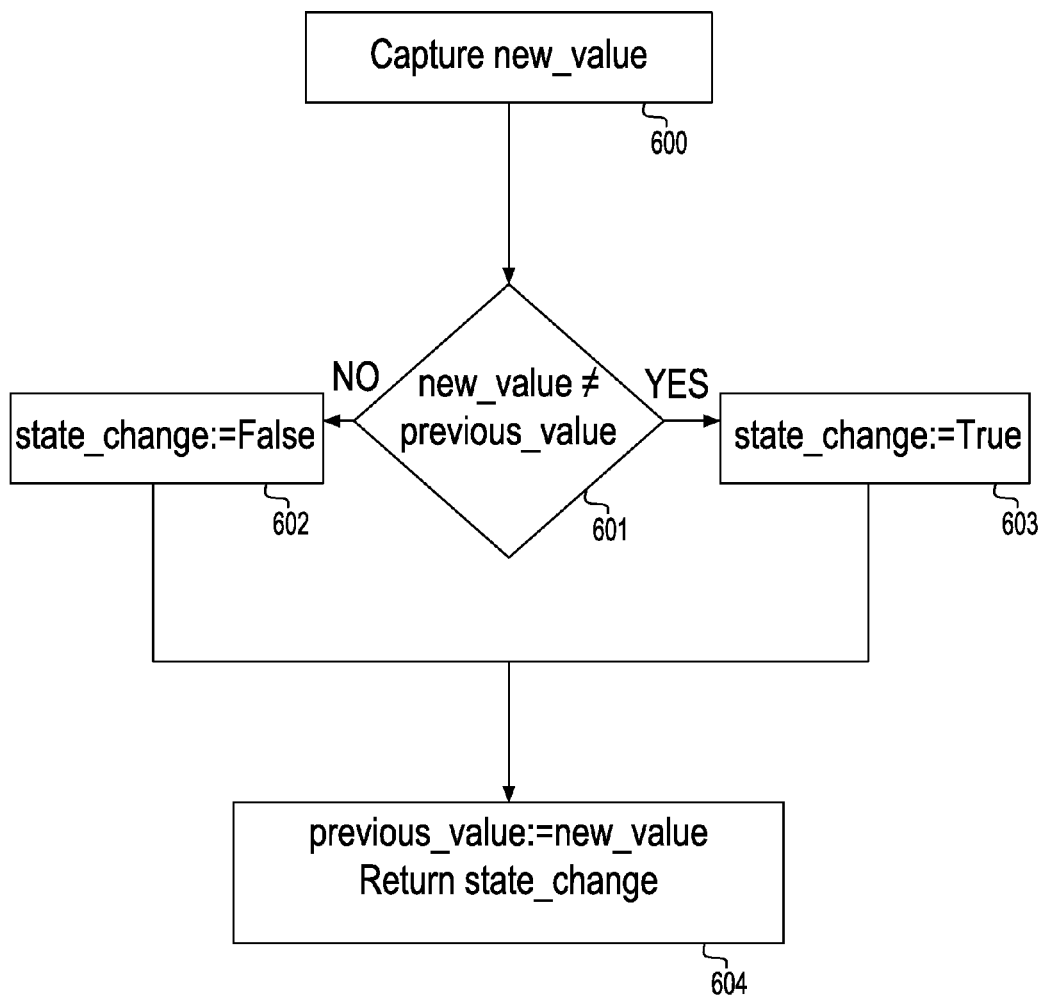
FIG. 6 shows the detection of environmental state changes from which a change in location can be inferred, in accordance with an embodiment of the present invention.

Referring now to FIG. 6, a new sample of the signal to be tested is captured 600 as a new value. The new value 601 is compared to the previous value of the signal. Responsive to the test, a variable state change is set either to False 602 or True 603. The newly sampled value, (referenced as the new_value), is stored as the previous value and the value of state change is returned 604.

Figure 7:
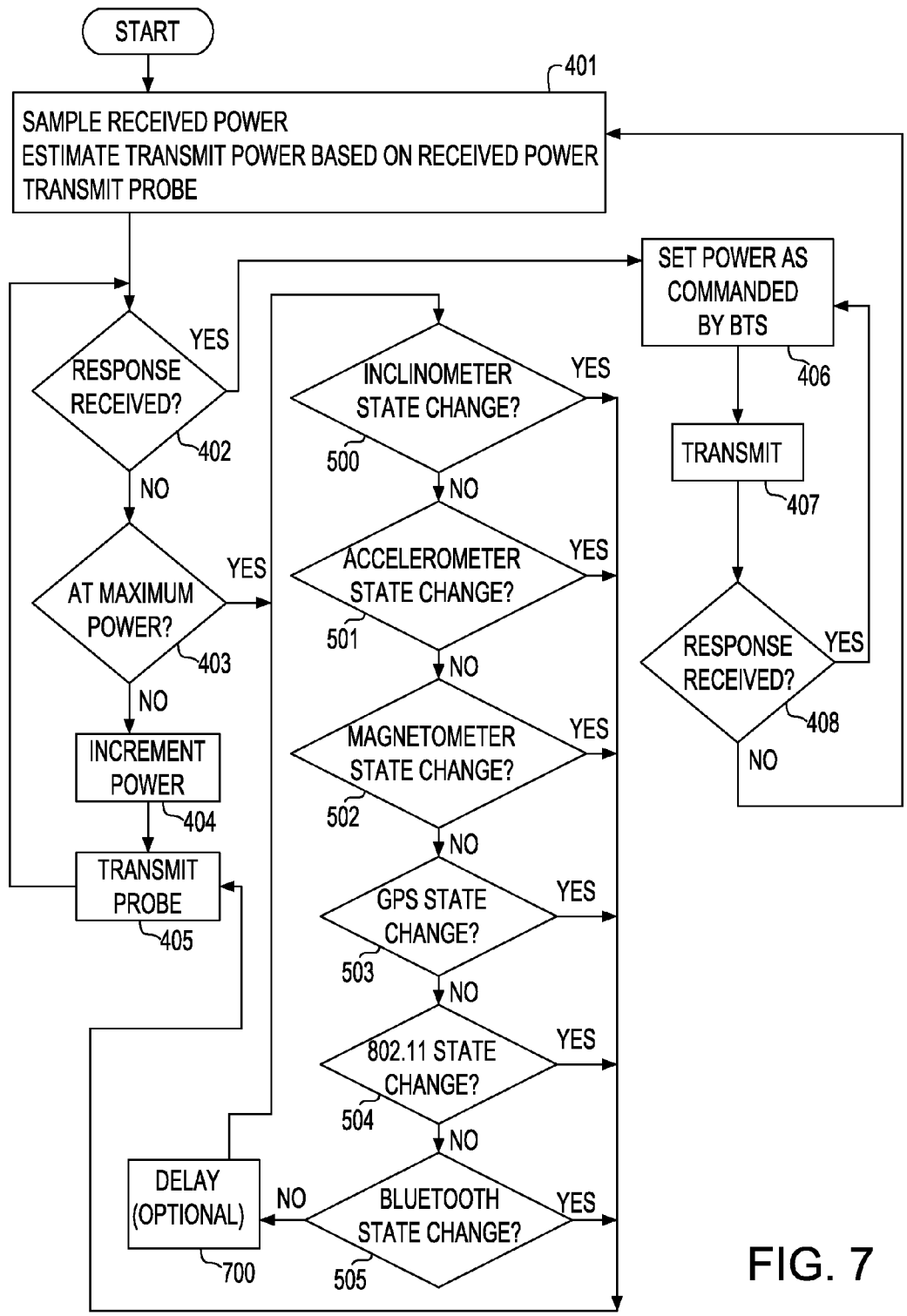
FIG. 7 depicts an alternate power management and conservation practiced in a mobile phone, according to an embodiment of the invention.
Figure 8:
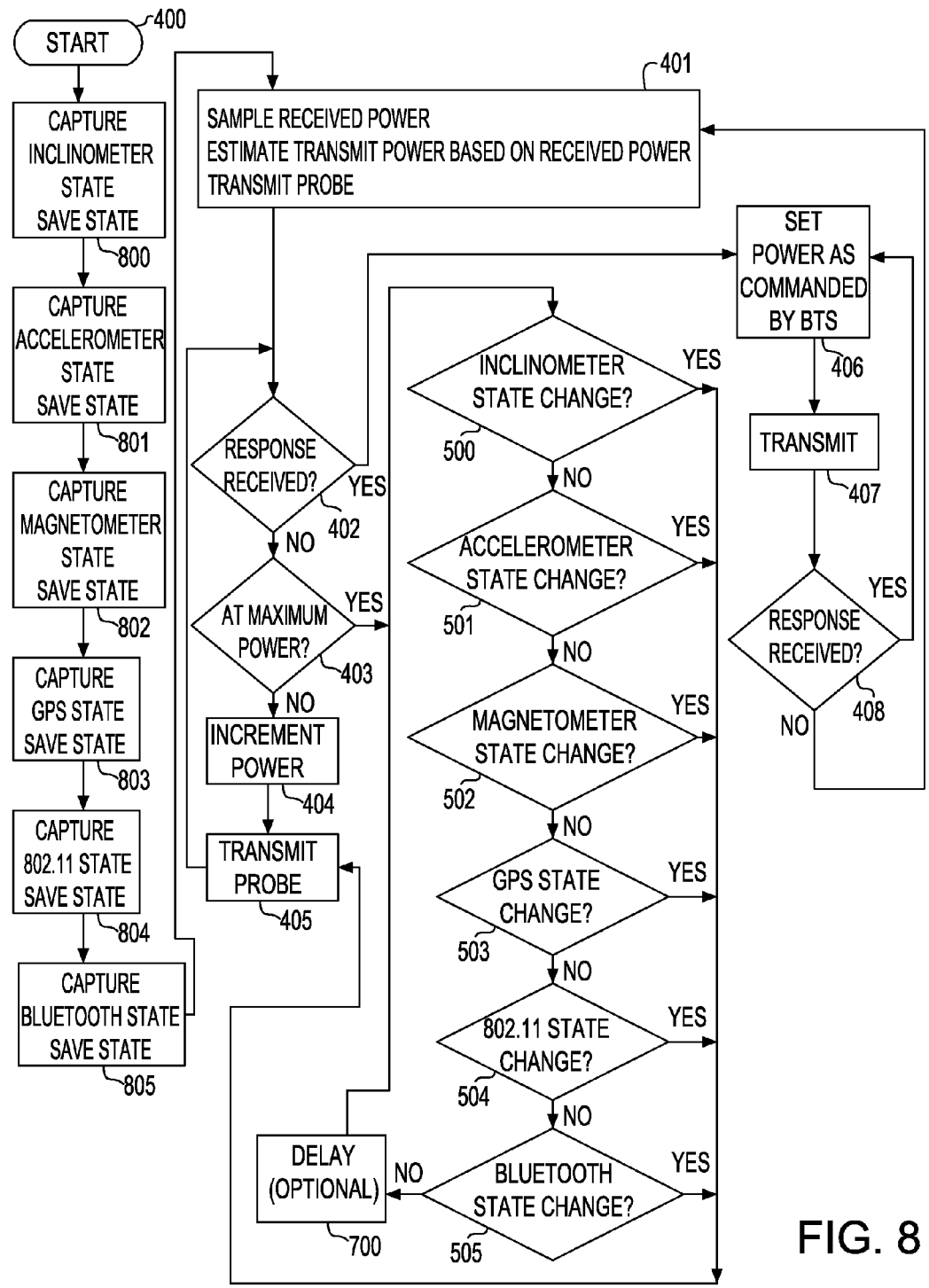
FIG. 8 depicts the power management and conservation shown in FIG. 5 with added initialization logic.

For reasons of clarity, initialization of the state detection logic of FIGS. 5, 6, and 7 is not shown. As a result, the first time each detector is sampled, it may falsely indicate a state change and result in an additional probe. The invention is functional as shown and the additional probes will not consume substantial power. FIG. 8 depicts the logic shown in FIG. 5 with initialization added.

In an alternate embodiment shown with reference to FIG. 7, it may be observed that it differs from the embodiment shown in FIG. 5 in that the latter conserves power by probing at a reduced rate when no response is received to maximum power probes. The embodiment depicted in FIG. 7, on the other hand, performs no power-expensive probes when the maximum power probe fails. Once this condition is reached 700, continuing checks for location change are made. The delay provides for a range of choices on a scale between maximum power conservation and maximum responsiveness. This value could be static or varied over time. One scheme would initially provide a short delay for responsiveness, but increase over time to provide best power conservation.

FIGS. 5 and 7 demonstrate resumption of probes once any sensor indicates a change from its previous state. As an alternate embodiment, it may be desirable to evaluate the results of multiple sensors before resuming probing. This can be advantageous, particularly in the case of an individual carrying a mobile phone on his person inside a shielded building with a wireless network. Resumption of probes based on motion (inclinometer or accelerometer sensing) would needlessly expend power, but qualifying this detection with a loss of sensing the wireless network can achieve the desired result of conserving power.

Additional embodiments include schemes similar to those shown in FIGS. 5 and 7. In these embodiments, if a sensor repeatedly changes state but probes to the base station do not elicit a response, that sensor is ignored or not further polled until another sensor changes state or until a response is received from the BTS in response to a probe triggered by change of state of another sensor.

While the present invention has been particularly described in conjunction with exemplary embodiments, it is evident that many alternatives, modifications and variations will be apparent to those skilled in the art in light of the present description. It is therefore contemplated that the appended claims will embrace any such alternatives, modifications and variations as falling within the scope and spirit of the present invention. It should be understood, however, that the description, while indicating preferred embodiments of the invention and numerous specific details thereof, is given by way of illustration and not of limitation. Many changes and modifications can be made within the scope of the present invention without departing from the spirit thereof, and the invention includes all such modifications.

What is claimed is:

1. A method for a mobile phone achieving a quiescent state, the method comprising:
   probing by a mobile phone a base-transceiver station (BTS) while in an open-loop mode, and responsive to the probing, failing to receive a response from the BTS within a predetermined time;
   upon receiving no response from the BTS and when the mobile phone is transmitting at a maximum power of the mobile phone, completely ceasing probing the BTS at any power level while testing a plurality of sensors to sense for a change in location of the mobile phone with respect to the BTS according to the following process:
      (i) sampling a first sensor to collect a first set of samples, said first sensor comprises one or more of an inclinometer, accelerometer, magnetometer, global positioning system (GPS), wireless signals received from a Local Area Network (LAN), gyroscope, and short-range wireless signal;
      (ii) re-sampling said first sensor to collect a second set of samples, and comparing values of said first set of samples to values of said second set of samples to detect a difference thereof;
      (iii) saving values of the second set of samples of the first sensor as first sensor preceding sampled values;
      (iv) when said comparing values of said first set of samples to values of said second set of samples from the first sensor reveals no difference, then sampling a second sensor different from the first sensor to collect a first set of samples and re-sampling the second sensor to collect a second set of samples, and comparing values of said first set of samples to values of said second set of samples from said second sensor to detect a difference thereof, said second sensor comprises one or more of an inclinometer, accelerometer, magnetometer, global positioning system (GPS), wireless signals received from a Local Area Network (LAN), gyroscope, and short-range wireless signal;
      (v) saving values of the second set of samples of the second sensor as second sensor preceding sampled values;
      (vi) activating a predetermined time delay when said comparing values of said first set of samples to values of said second set of samples from said second sensor reveals no difference;
      (vii) after the predetermined time delay, re-sampling said first sensor to collect a new set of samples and comparing values of the new set of samples with the first sensor preceding sampled values to detect a difference thereof;
      (viii) when said comparing values of said new set of samples of the first sensor with the first sensor preceding sampled values reveals no difference, then re-sampling said second sensor to collect a new set of samples and comparing values of the new set of samples of the second sensor with the second sensor preceding sampled values to detect a difference thereof;
      (ix) saving the new set of samples of the first sensor as the first sensor preceding sampled values and saving the new set of samples of the second sensor as the second sensor preceding sampled values;
      (x) when said comparing values of the new set of samples of the second sensor with the second sensor preceding sampled values reveals no difference, activating the predetermined time delay and repeating steps (vii) to (x) until a difference between the new set of samples of the first sensor and the first sensor preceding sampled values is obtained or until a difference between the new set of samples of the second sensor and the second sensor preceding sampled values is obtained, wherein the predetermined time delay increases each time steps (vii) to (x) are repeated to maintain power conservation; and
   resuming probing said BTS only when said difference for said first sensor or said second sensor is detected.

2. The method as recited in claim 1, further comprising initially starting said probing in said open-loop mode with power level based on receiving said power level from said BTS.

3. The method as recited in claim 1, further comprising incrementing said power until reaching maximum power or until receiving said response.

4. The method as recited in claim 1, further comprising if said mobile phone and BTS do not achieve communication when said mobile phone is at a particular location, said communication is achieved by relocating said mobile phone.

5. The method as recited in claim 1, wherein said mobile phones detect changes in orientation through signals provided by the magnetometer.

6. The method as recited in claim 1, wherein said mobile phones detect position changes through signals provided by the accelerometer or the inclinometer.

7. The method as recited in claim 1, wherein the quiescent state resumes if communication is not achievable.

8. The method as recited in claim 1 further comprising using a low-power processor for sampling the sensors while quiescing other processors used.

9. A method for achieving power-conservation and for achieving a quiescent state, the method comprising in the following order:
   probing by a mobile phone a base-transceiver station (BTS) while in an open-loop mode, and responsive to the probing, failing to receive a response from the BTS within a predetermined time;
   upon receiving no response from the BTS and when the mobile phone is transmitting at a maximum power of the mobile phone, completely ceasing probing the BTS at any power level while testing a plurality of sensors to sense for a change in location of the mobile phone with respect to the BTS according to the following process;
   (i) sampling a first sensor to collect a first set of samples, said first sensor is selected from the group consisting of an inclinometer, an accelerometer, a magnetometer, a global positioning system (GPS), gyroscope, or wireless signals received from a Local Area Network (LAN);
   (ii) re-sampling said first sensor to collect a second set of samples;
   (iii) comparing said values of said first set of samples to values of said second set of samples;
   (iv) saving values of the second set of samples of the first sensor as first sensor preceding sampled values;
   (v) when said comparing reveals no difference between said first set of samples and said second set of samples from the first sensor, sampling a second sensor different from the first sensor to collect a first set of samples and re-sampling said second sensor to collect a second set of samples, and comparing values of said first set of samples to values of said second set of samples from said second sensor to detect a difference thereof, said second sensor is selected from the group consisting of an inclinometer, an accelerometer, a magnetometer, a global positioning system (GPS), gyroscope, or wireless signals received from a Local Area Network (LAN);
   (vi) saving values of the second set of samples of the second sensor as second sensor preceding sampled values;
   (vii) activating a predetermined time delay when said comparing values of said first set of samples to values of said second set of samples from said second sensor reveals no difference;
   (viii) after the predetermined time delay, re-sampling said first sensor to collect a new set of samples and comparing values of the new set of samples with the first sensor preceding sampled values to detect a difference thereof;
   (ix) when said comparing values of said new set of samples of the first sensor with the first sensor preceding sampled values reveals no difference, then re-sampling said second sensor to collect a new set of samples and comparing values of the new set of samples of the second sensor with the second sensor preceding sampled values to detect a difference thereof;
   (x) saving the new set of samples of the first sensor as the first sensor preceding sampled values and saving the new set of samples of the second sensor as the second sensor preceding sampled values;
   (xi) when said comparing values of the new set of samples of the second sensor with the second sensor preceding sampled values reveals no difference, activating the predetermined time delay and repeating steps (viii) to (xi) until a difference between the new set of samples of the first sensor and the first sensor preceding sampled values is obtained or until a difference between the new set of samples of the second sensor and the second sensor preceding sampled values is obtained, wherein the predetermined time delay increases each time steps (viii) to (xi) are repeated to maintain power conservation; and
   resuming probing said BTS only when said difference for said first sensor or said second sensor is detected.

10. The method as recited in claim 9 wherein said gyroscope sensor is used for interchanging with others of said sensors.

* * * * *